Sept. 10, 1946.  E. G. BODEN  2,407,532
BEARING MOUNTING
Filed Sept. 10, 1945  2 Sheets-Sheet 1

INVENTOR:
Ernest G. Boden,
BY Cary Kerr & Gravely
ATTORNEYS

Patented Sept. 10, 1946

2,407,532

UNITED STATES PATENT OFFICE 2,407,532

BEARING MOUNTING

Ernest G. Boden, Canton, Ohio, assignor to The Timken Roller Bearing Company, Canton, Ohio, a corporation of Ohio Application September 10, 1945, Serial No. 615,396

6 Claims. (Cl. 308—207)

My invention relates to bearing mountings of the type wherein a bearing member of one bearing is rigidly mounted, as by press fitting, and the corresponding member of another bearing spaced from the first bearing, is loosely mounted to permit bearing adjustment. In bearings of this type, the loosely mounted bearing member has a tendency to rotate relative to the corresponding rigidly mounted member; and it is the principal object of this invention to prevent such relative rotation while, at the same time, permitting bearing adjustment.

The invention consists principally in interposing between the corresponding bearing members, one of which is rigidly mounted and the other of which is loosely mounted, a resilient spacer member which can yield to accommodate endwise movement of the loosely mounted member bearing to permit bearing adjustment but which will engage said bearing member with sufficient pressure and friction to prevent rotation thereof relative to the corresponding rigidly mounted member of the other bearing. The invention further consists in the bearing mounting and in the parts and combinations and arrangements of parts hereinafter described and claimed.

Figure 1:
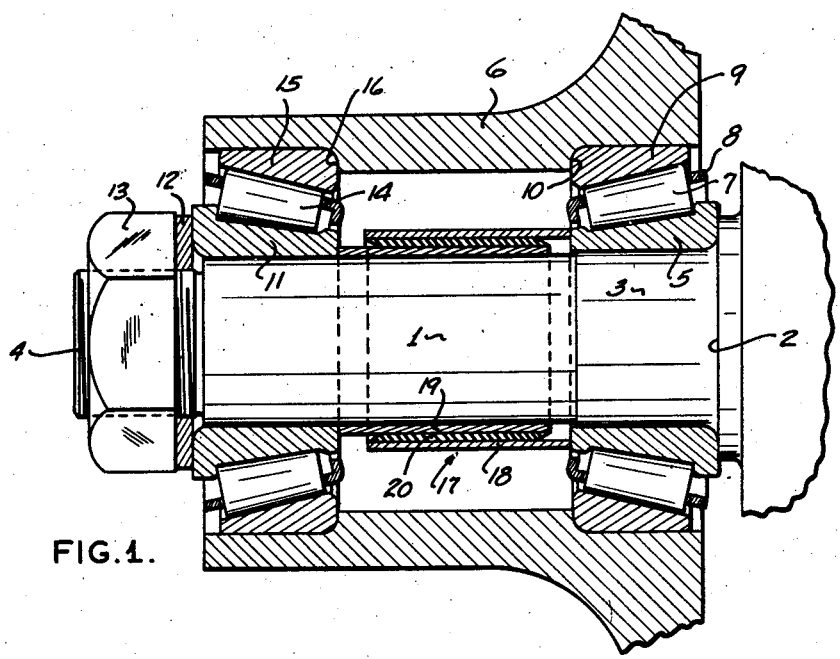
Figure 2:
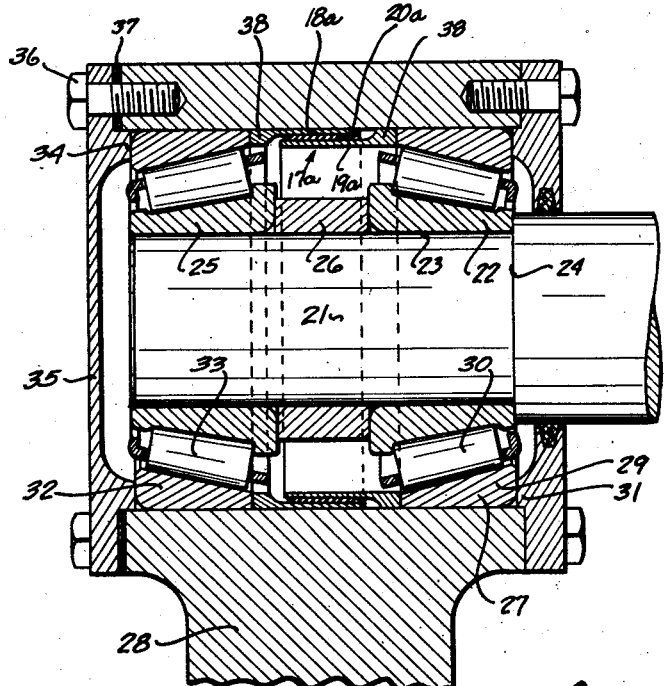
Figure 3:
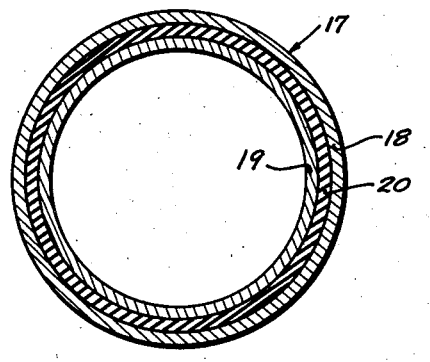
Figure 4:
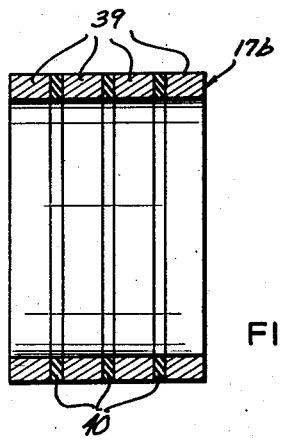
Figure 5:
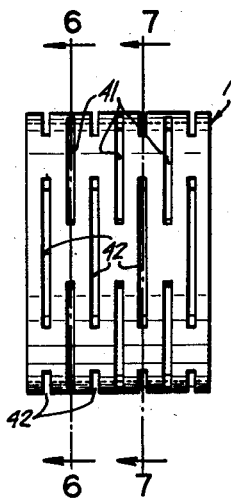
Figure 6:
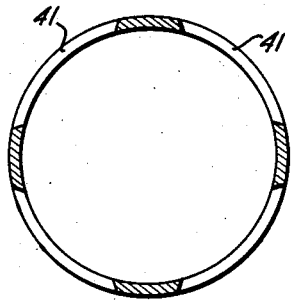
Figure 7:
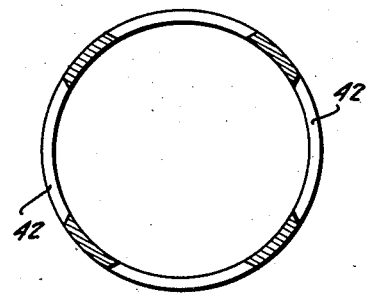

In the accompanying drawings,

Fig. 1 is a longitudinal sectional view of a pinion bearing mounting embodying my invention, the bearings being indirectly mounted, Fig. 2 is a longitudinal sectional view of the bearing mounting for the crank pin or the like, the bearings being directly mounted, Fig. 3 is a cross sectional view of the spacer member of Fig. 1, Fig. 4 is a longitudinal sectional view of a modified spacer member, Fig. 5 is a side elevation of another modified spacer member; and Figs. 6 and 7 are cross sectional views on the lines 6—6 and 7—7 respectively in Fig. 5.

In Fig. 1 is illustrated an automobile pinion shaft bearing mounting, comprising a shaft 1 having a shoulder 2 at its innermost end and an enlarged bearing seat 3 adjacent to said shoulder and a reduced threaded projection 4 at its outermost end. The cone 5 or inner bearing member of a tapered roller bearing is press fitted on said bearing seat 3 against said shoulder 2. A housing 6 surrounds said shaft and is spaced therefrom. Mounted on said bearing cone 5 is a series of tapered rollers 7 provided with a suitable cage 8 and said rollers are disposed in a cup 9 or outer bearing member that is seated against an internal shoulder 10 in said housing 6.

Mounted on the outermost end of said shaft 1 is a bearing cone 11 whose large end overhangs the body portion of the shaft 1 so as to be engaged by a washer 12 which, in turn, is engaged by an adjusting nut 13 that is mounted on the threaded end 4 of said shaft 1. Mounted on said cone 11 is a series of tapered rollers 14 that are disposed in a cup 15 or outer bearing member that is mounted against an internal shoulder 16 in the outermost end of said housing 6.

Interposed between the bearing cones 5 and 11 is a resilient spacer member 17 comprising an outer metal sleeve 18 and an inner metal sleeve 19 that overlap throughout most, but not all, of their length and a sleeve 20 of synthetic rubber or other resilient material interposed between said metal sleeves and bonded to both thereof. The projecting end of the inner metal sleeve 19 engages the outermost bearing cone 11 and the projecting end of the outer metal sleeve 18 engages the end of the innermost bearing cone 5. The bearings are indirectly mounted, that is, the small ends of the two sets of rollers 7 and 14 face each other. Bearing adjustment is made by rotating the adjusting nut 13 to push the outermost bearing cone 11 endwise along the shaft 1. The adjustment is transmitted through the rollers 14, the bearing cup 15 and the housing 6 to the bearing cup 9 of the innermost bearing.

The resilient spacer sleeve yields sufficiently to accommodate bearing adjustment, but its pressure and frictional engagement with the outermost bearing cone 11 are sufficient to prevent rotation thereof relative to the innermost bearing cone 5.

In Fig. 2 is shown a crank pin 21 or the like having the cone 22 of the innermost bearing press fitted on a seat 23 and against a shoulder 24 and the cone 25 of the outermost bearing press fitted on the outermost end of said pin, a spacer ring 26 being interposed therebetween. Mounted in the innermost end of the opening 27 in a connecting rod 28 is the cup 29 of the innermost bearing, tapered rollers 30 being interposed between said cup 29 and the cone 22. Said innermost bearing cup 29 is engaged by a closure ring 31 mounted in the opening 27 of said rod 28. The cup 32 of the outermost bearing is mounted in the outer end of said opening 27, tapered rollers 33 being interposed between said cup 32 and the cone 25. Said outermost cup 32 is engaged by an annular shoulder 34 on a cap 35 that is mounted over said opening 27. Said cap 35 is secured to the rod 28 by means of screws 36. Shims 37 interposed between the cap 35 and the rod 28 permit adjustment of the bearings.

The bearings shown in Fig. 2 are directly mounted, that is, the large ends of the two sets of rollers 30 and 33 face each other. A spacer member 17a, similar to that shown in Fig. 1, is interposed between the bearing cups of Fig. 2. Said spacer member comprises an inner metal sleeve 19a, an outer metal sleeve 18a and an intermediate sleeve 20a of synthetic rubber or the like bonded to both of said metal sleeves, said metal sleeves overlapping through most, but not all, of their length and said rubber sleeve extending throughout the overlapping portions of said metal sleeves. The ends 38 of the metal sleeves of the spacer shown in Fig. 2 are enlarged, so as to have an extensive engagement with the bearing cups.

In Fig. 4 is shown a modified form of spacer member 17b comprising a plurality of metal rings or washers 39 with washers 40 of synthetic rubber or other resilient material interposed between them and bonded thereto.

In Figs. 5, 6 and 7 is shown another form of spacer 17c comprising a metal tube which is made resilient by the provision of a multiplicity of staggered circumferential cuts 41 and 42.

Other forms of spacer members may be substituted for those shown in the drawings. The bearing mountings hereinabove described have the important advantage of preventing relative rotation between corresponding members of two bearings while, at the same time, permitting adjustment of said bearings. Obviously, numerous changes may be made without departing from the invention and I do not wish to be limited to the precise construction shown.

What I claim is:

1. A bearing mounting comprising a shaft, a housing surrounding said shaft, spaced bearings interposed between said housing and said shaft, each comprising an inner bearing member, an outer bearing member and rollers therebetween, one bearing member of one bearing being mounted loosely enough to permit adjustment and a resilient spacer between said adjustable bearing member and the corresponding bearing member of the other bearing, whereby adjustment of said adjustable bearing member is permitted and rotation thereof relative to the corresponding member of the other bearing is prevented.

2. A bearing mounting comprising a shaft, a housing surrounding said shaft, spaced bearings interposed between said housing and said shaft, each comprising an inner bearing member, an outer bearing member and rollers therebetween, one bearing member of one bearing being mounted loosely enough to permit adjustment and a resilient spacer between said adjustable bearing member and the corresponding bearing member of the other bearing, whereby adjustment of said adjustable bearing member is permitted and rotation thereof relative to the corresponding member of the other bearing is prevented, said spacer consisting of nested sleeves overlapping throughout most of their length and a sleeve of resilient material therebetween and bonded thereto, said resilient sleeve extending the length of the overlapping portions of said inner and outer sleeves, the inner sleeve engaging one bearing member and the outer sleeve engaging the other bearing member.

3. A bearing mounting as set forth in claim 1 wherein the bearings are taper roller bearings and said spacer is interposed between the inner bearing members.

4. A bearing mounting as set forth in claim 1 wherein the bearings are taper roller bearings and said spacer is interposed between the outer bearing members.

5. A bearing mounting comprising a shaft, a housing surrounding said shaft, spaced indirectly mounted tapered roller bearings interposed between said housing and said shaft, each comprising an inner bearing cone, an outer bearing cup and tapered rollers therebetween, one inner bearing cone being mounted at the end of said shaft loosely enough to permit adjustment, means for adjusting said inner bearing cone, said shaft having a shoulder spaced from its end, the other inner bearing cone being pressed on said shaft against said shoulder, said housing having internal shoulders against which said outer bearing cups abut, and a resilient spacer between said inner bearing cones, whereby adjustment of said adjustable inner bearing cone is permitted and rotation thereof relative to the other inner cone is prevented.

6. A bearing mounting comprising a shaft, a housing surrounding said shaft, spaced directly mounted tapered roller bearings interposed between said housing and said shaft, each comprising an inner bearing cone, an outer bearing cup and tapered rollers therebetween, one bearing cup of one bearing being mounted loosely enough in the housing to permit adjustment, means for adjusting said cup, an abutment for the outer bearing cup, said shaft having a shoulder spaced from its end, said bearing cones being pressed on said shaft, one against said shoulder, a spacer between said cones, and a resilient spacer between said adjustable bearing cup and the other bearing cup, whereby adjustment of said adjustable cup is permitted and rotation thereof relative to the other cup is prevented.

ERNEST G. BODEN.